US012726059B2

(12) United States Patent
Chowdhury et al.

(10) Patent No.: US 12,726,059 B2
(45) Date of Patent: Sep. 1, 2026

(54) MULTIPLE WOUND ROTOR FOR ELECTRIC MACHINE

(71) Applicant: GM GLOBAL TECHNOLOGY OPERATIONS LLC, Detroit, MI (US)

(72) Inventors: Mazharul Chowdhury, Canton, MI (US); Muhammad A. Zahid, Troy, MI (US); Alexander Forsyth, Windsor (CA); Khorshed Mohammed Alam, Canton, MI (US); Yilun Luo, Ann Arbor, MI (US); Junghoon Kim, Springboro, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 18/483,577

(22) Filed: Oct. 10, 2023

(65) Prior Publication Data

US 2025/0119005 A1 Apr. 10, 2025

(51) Int. Cl.

| | |
|---|---|
| ***H02K 1/22*** | (2006.01) |
| ***H02K 1/12*** | (2006.01) |
| ***H02K 5/20*** | (2006.01) |
| ***H02K 9/00*** | (2006.01) |
| ***H02K 11/30*** | (2016.01) |

(52) U.S. Cl.

CPC ................ *H02K 1/22* (2013.01); *H02K 1/12* (2013.01); *H02K 5/20* (2013.01); *H02K 9/00* (2013.01); *H02K 11/30* (2016.01)

(58) Field of Classification Search

CPC .. H02K 1/12; H02K 1/22; H02K 5/20; H02K 9/00; H02K 11/30

USPC .......................................................... 310/52

See application file for complete search history.

(56) References Cited

U.S. PATENT DOCUMENTS

| | | | | |
|---|---|---|---|---|
| 11,804,747 | B2 * | 10/2023 | Singh | H02K 9/227 |
| 2017/0098989 | A1 * | 4/2017 | Kitada | H02K 47/20 |
| 2020/0227988 | A1 * | 7/2020 | Zhu | H02K 16/02 |
| 2022/0294286 | A1 | 9/2022 | Holcomb | |
| 2023/0112852 | A1 * | 4/2023 | Sarlioglu | H02K 5/20 310/58 |
| 2024/0006967 | A1 * | 1/2024 | Seguchi | H02K 11/0094 |
| 2025/0119005 | A1 * | 4/2025 | Chowdhury | H02K 19/12 |
| 2025/0253729 | A1 * | 8/2025 | Bourniche | H02K 1/20 |

FOREIGN PATENT DOCUMENTS

| | | | |
|---|---|---|---|
| DE | 69511933 | T2 | 3/2000 |
| WO | 2022187715 | A1 | 9/2022 |

* cited by examiner

*Primary Examiner* — Rashad H Johnson
(74) *Attorney, Agent, or Firm* — Quinn IP Law

(57) ABSTRACT

An electric machine including a stator having a plurality of stator windings configured for generating a magnetic field and a rotor configured for rotating within the stator according to a torque induced by the magnetic field. The rotor includes a plurality of electrically independent rotor winding sets wrapped around each of a plurality of circumferentially spaced rotor protrusions. The electric machine further includes a power transfer circuit operable for independently controlling electrical excitation of the rotor winding sets. The electric machine further includes a cooling system for dissipating heat way from the rotor winding sets.

20 Claims, 4 Drawing Sheets

160
164
164
130 (130B)
130 (130A)
144
150
154
148
154
146
152
152
140
142
120
162
162
160

MULTIPLE WOUND ROTOR FOR ELECTRIC MACHINE

INTRODUCTION

The present disclosure relates generally to electric machines, and more particularly, relates to a multiple wound rotor for an electric machine.

Some electric machines include a rotor configured for rotating within a stator. A common implementation of those type of electric machines includes the rotor having a single set of rotor windings operable for rotating in response to a magnetic field from the stator. Such implementation is widely used and is generally believed to be adequate. However, rotors having a single set of rotor windings may be relatively susceptible to torque ripples, particularly those stemming from oscillations in electric currents used to in the excitation thereof. This reliance on a single set of rotor windings, especially when faced with torque ripples, may influence the overall performance of the electric machine.

SUMMARY

One aspect of the present disclosure relates to an electric machine having a multiple wound rotor. The multiple wound rotor may include a plurality of independently excitable rotor windings sets configured for minimizing or reducing torque ripples. The present disclosure further relates to a cooling system that provides in-slot cooling of the multiple wound rotor and improves the thermal performance of the multiple wound rotor.

An electric machine is provided. The electric machine includes a stator including a plurality of stator windings configured for generating a magnetic field and a rotor configured for rotating within the stator according to a torque induced by the magnetic field. The rotor includes a plurality of electrically independent rotor winding sets wrapped around each of a plurality of circumferentially spaced rotor protrusions. The electric machine further includes a power transfer circuit operable for independently controlling electrical excitation of the rotor winding sets.

In some embodiments, the rotor winding sets include an inner set and an outer set, with the power transfer circuit operable for providing an inner current operable for electrically exciting the inner set and an outer current operable for electrically exciting the outer set.

In some embodiments, the inner and outer sets include a plurality of conducting coils wrapped with an equal quantity of turns.

In some embodiments, each of the winding sets include a plurality of conducting coils wrapped with more turns than a plurality of conducting coils of another one of the winding sets.

In some embodiments, each of the winding sets include a plurality of conducting coils composed of the same material.

In some embodiments, a plurality of conducting coils of one or more of the winding sets include a first material and a plurality of conducting coils of another one of the winding sets include of a second material differing from the first material.

In some embodiments, each of the winding sets include a plurality of conducting coils having the same cross-sectional area.

In some embodiments, a plurality of conducting coils of one or more of the winding sets has a first cross-sectional area and a plurality of conducting coils of another one of the winding sets has a second cross-sectional area, the second cross-sectional area differing from the first cross-sectional area.

In some embodiments, the conducting coils having the first cross-sectional area generate a first current density when excited with a first amount of electrical current, and the conducting coils having the second cross-sectional area generate a second current density when excited with the first amount of electrical current.

In some embodiments, the rotor includes a plurality of rotor slots shaped between each adjoining rotor protrusion and a cooling system configured for dissipating heat away from the rotor slots.

In some embodiments, the cooling system includes one or more cooling channels disposed within each of the rotor slots and a coolant source configured for circulating a coolant through the cooling channels to dissipate heat therefrom.

In some embodiments, the one or more of the cooling channels are shaped to wrap substantially around each of the windings sets.

In some embodiments, one or more of the cooling channels are shaped to contact three sides of each of the winding sets.

In some embodiments, the inner set is disposed radially inward relative to the outer set.

In some embodiments, the rotor slots are shaped to include an inner wall, an outer wall, an upper sidewall, and a lower sidewall such that the inner set is proximate the inner wall and the outer set is proximate the outer wall.

In some embodiments, one or more of the cooling channels are shaped to dissipate heat from a middle gap coinciding with a middle area between the inner and outer sets.

In some embodiments, one or more of the cooling channels are shaped to dissipate heat from an inner gap coinciding with an inner area between the inner set and the inner wall associated.

In some embodiments, one or more of the cooling channels are shaped to dissipate heat from an outer gap coinciding with an outer area between the outer set and the outer wall associated therewith.

According to an alternative embodiment, an electric machine includes a stator and a rotor configured for rotating within the stator. The rotor includes a plurality of circumferentially spaced rotor protrusions and a plurality of rotor slots shaped between each adjoining rotor protrusions, with at least in inner rotor windings and an outer rotor winding wrapped around each of the rotor protrusions. The inner and outer rotor windings are electrically isolated from each other. The electric machine further includes a power transfer circuit operable for independently controlling electrical excitation of the rotor winding and a cooling system configured for dissipating heat away from an interior of the rotor protrusions. The cooling system includes one or more cooling channels disposed within each of the rotor slots and a coolant source configured for circulating a coolant through the cooling channels to dissipate heat therefrom.

In some embodiments, a vehicle with an electric engine is provided. The vehicle includes a vehicle body, multiple drive wheels mounted to the vehicle body; and an electric machine mounted to the vehicle body. The electric machine is operable to drive one or more of the drive wheels to thereby propel the motor vehicle. The electric machine includes a stator having a plurality of stator windings configured for generating a magnetic field and a rotor configured for rotating within the stator according to a torque induced by the magnetic field. The rotor includes a plurality of electrically independent rotor windings sets wrapped around each of a plurality of circumferentially spaced rotor protrusions. The rotor winding sets include an inner set and an outer set. The electric machine further includes a power transfer circuit operable for independently controlling an excitation of each of the rotor winding sets. The power transfer circuit operable for providing an inner current operable for electrically exciting the inner set and an outer current operable for electrically exciting the outer set. The electric machine further includes a cooling system configured for dissipating heat away from the rotor protrusions. The cooling system includes one or more cooling channels disposed within each of the rotor slots and a coolant source configured for circulating a coolant through the cooling channels to dissipate heat therefrom. The rotor includes a plurality of rotor slots shaped between each adjoining rotor protrusions, the rotor slots are shaped to include an inner wall, an outer wall, an upper sidewall, and a lower sidewall such that the inner set is proximate the inner wall and the outer set is proximate the outer wall. The cooling channels are shaped to dissipate heat from a middle gap coinciding with a middle area between the inner and outer sets, from an inner gap coinciding with an inner area between the inner set and the inner wall associated, and from an outer gap coinciding with an outer area between the outer set and the outer wall associated therewith.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
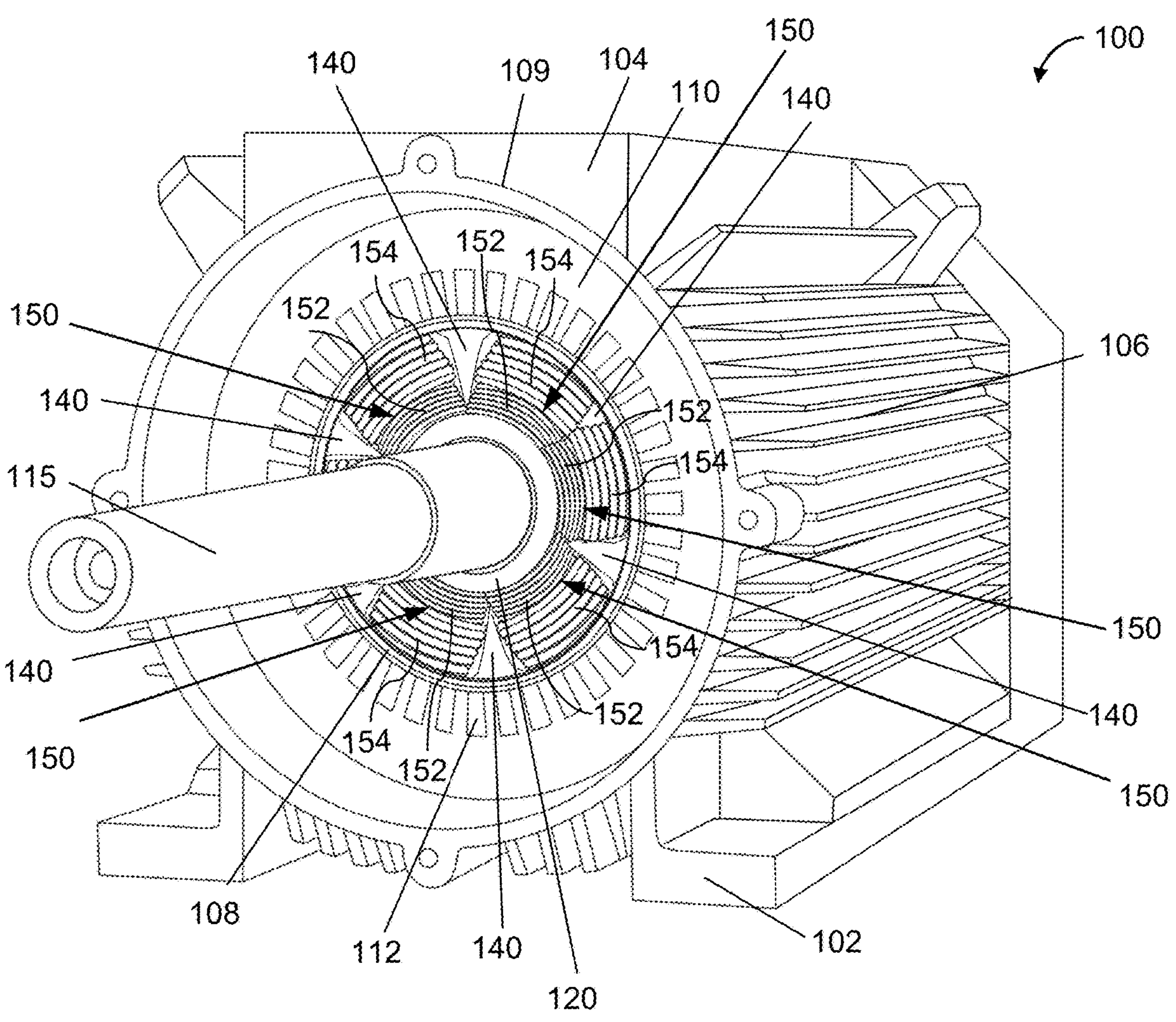
FIG. 1 is a perspective view of an electric machine having a stator and a rotor within the stator, in accordance with one or more implementations of the disclosure.

FIG. 1 is a perspective view of an electric machine 100 having a stator 110 and a rotor 120 within the stator 110, in accordance with one or more implementations of the disclosure. The electric machine 100 includes a stator 110 having a plurality of stator windings or other features suitable for generating a rotating magnetic field (RMF).

The electric machine 100 may include a base 102 coupled to a housing 104 of the electric machine 100. The housing 104 may be coupled to sets of fins 106 for dissipating heat generated by the electric machine 100. The electric machine 100 may include a controller for controlling the input alternating current (AC) and monitoring parameters, etc.

Referring still to FIG. 1, the stator slots 112 arranged around the inner portion of the stator 110 open to an air gap 108 which separates the stator 110 and rotor 120. For simplicity, although the stator slots 112 in the stator 110 and various openings in the rotor 120 lead directly to the air gap 108, FIG. 1 defines the air gap 108 using two circles that extend around the inner periphery of the stator 110 and outer portion of the rotor 120. The rotor 120 in this configuration has a cylindrical outline, although this geometry may vary widely and other rotors may employ different geometries, e.g., using a different number and geometry of poles distributed around the rotor 120, or otherwise. A circular housing 109 is disposed across an outer periphery of the stator 110.

Figure 2:
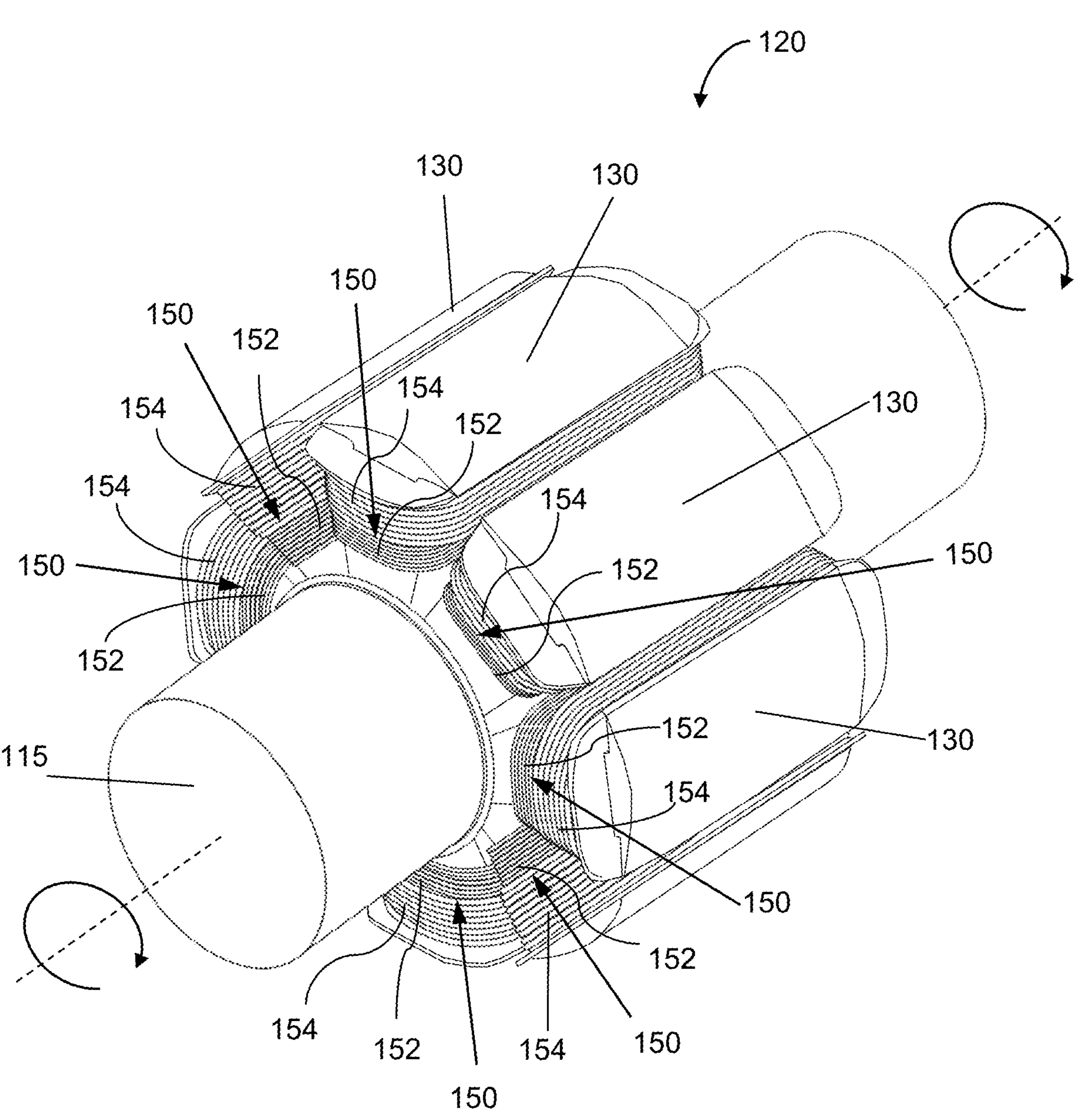
FIG. 2 is a perspective view of the rotor having a plurality of rotor protrusions including a plurality of rotor winding sets, in accordance with one or more implementations of the disclosure.

The rotor 120 is configured for rotating within the stator 110 according to a torque induced by the magnetic field. The rotor 120 includes a plurality of electrically independent rotor winding sets 150 wrapped around each of a plurality of rotor protrusions 130 as shown in FIG. 2. The rotor winding sets 150 are configured to be electrically excited with direct current. Each winding set 150 includes an inner set 152 and an outer set 154. Although two sets are shown, it is understood that the rotor winding sets 150 include two or more sets.

The electric machine 100 of FIG. 1 also shows a shaft 115. Depending on the application, the shaft 115 may rotate with the rotor 120 at different loads to do work. For example, the turning shaft 115 may be used to rotate one or more of the wheels of a vehicle.

As used herein a "vehicle" or "motor vehicle" may be used interchangeably and is understood to mean a device configured for transporting people, things, objects, or the like. Non-limiting examples of motor vehicles (e.g., internal combustion engine (ICE) vehicles, electric vehicles including electric battery and fuel cell vehicle or the like) include land vehicles (e.g., cars, trucks, motorcycles, electric bike, buses, trains or the like), aerial vehicles (e.g., airplanes, helicopters, unmanned aerial vehicles or the like), water vehicles (e.g., boats, watercrafts, or the like) and amphibious vehicles (e.g., hovercrafts or the like).

Additional aspects of this disclosure are directed to the electric machine 100 being operably disposed, incorporated, or otherwise used in a vehicle, for example, an electric vehicle. In one embodiment, the electric vehicle includes a vehicle body, multiple drive wheels mounted to the vehicle body, and the electric machine 100 mounted to the vehicle body and operable to drive one or more of the drive wheels to thereby propel the electric vehicle.

The electric machine 100 may be used as a motor to convert electrical energy into mechanical energy, as previously discussed regarding propelling the electric vehicle. Alternatively, the electric machine 100 may be used as a generator to convert mechanical energy into electrical energy. Regardless the mode of use, the electric machine 100 operates on the principle of electromagnetic induction, where the motion of a conductor within a magnetic field generates an electrical voltage (as in the case of a motor) and the interaction between magnetic fields and electrical currents generates mechanical motion (as in the case of a generator).

FIG. 2 is a perspective view of the rotor 120 having a plurality of rotor protrusions 130 including a plurality of rotor winding sets 150, in accordance with one or more implementations of the disclosure.

As illustrated in FIG. 2, the rotor 120 includes eight rotor protrusions 130 with a winding set 150 wrapped around each of the eight rotor protrusions 130. Although eight rotor protrusions 130 are shown in FIG. 2, it is understood that the rotor 120 may have greater or less than eight rotor protrusions 130. For example, the rotor 120 may have rotor protrusions 130 in the amount of 2, 4, 6, 8, 10, 12, or greater.

Figure 3:
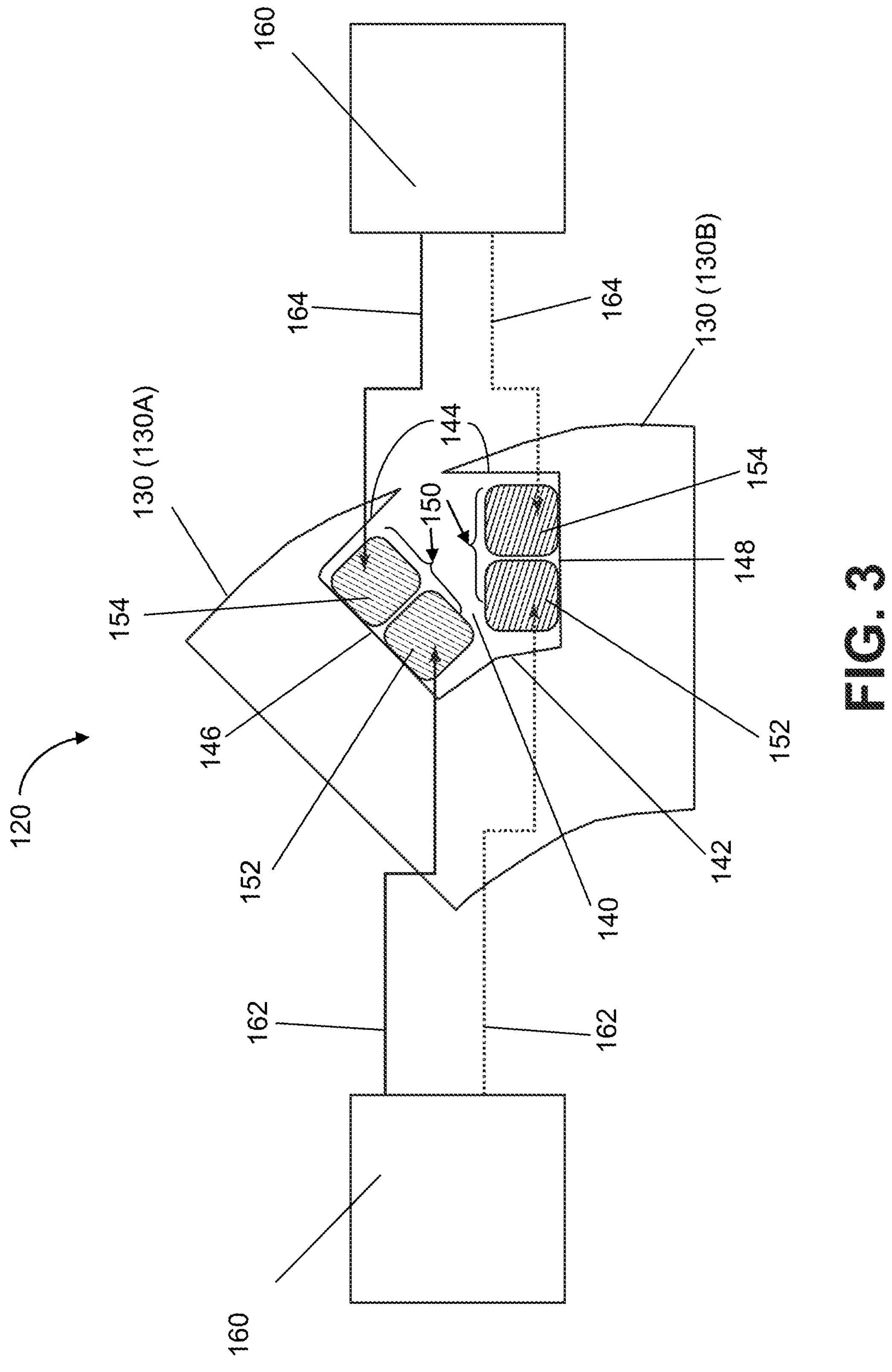
FIG. 3 is a schematic view of a cross-sectional portion of the rotor having multiple rotor winding sets in electrical communication with a power transfer circuit, in accordance with one or more implementations of the disclosure.

Each winding set 150 includes an inner set 152 and outer set 154 that are independently excited by a power transfer circuit 160 as shown in FIG. 3. The inner set 152 is disposed radially between the outer set 154 and the center axis of rotation of the rotor 120. The inner set 152 includes a plurality of conductive coils wrapped around one of the eight rotor protrusions 130 with N number of turns. Each inner set 152 relative to a corresponding rotor protrusion 130 may have N number of turns or may have a number of turns greater or less than N number.

The plurality of conductive coils of the inner set 152 may have the same cross-sectional area and generate a current density when excited by an electrical current (i.e., direct current). The plurality of conductive coils of the inner set 152 may have differing cross-sectional areas and generate differing current density when excited with the same amount of electrical current.

The outer set 154 also includes a plurality of conductive coils wrapped around each of the eight rotor protrusions 130 with M number of turns. Each outer set 154 relative to a corresponding rotor protrusion 130 may have M number of turns or may have number of turns greater or less than M number.

The plurality of conductive coils of the outer set 154 may have the same cross-sectional area and generate a current density when excited by an electrical current (i.e., direct current). The plurality of conductive coils of the outer set 154 may have differing cross-sectional areas and generate differing current density when excited with the same amount of electrical current.

For both the inner set 152 and the outer set 154, the conductive coils are electrically conductive. The conductive coils may be composed of the same material or different material. The material may be copper, aluminum, copper-clad aluminum (CCA), silver-plated copper, silver-plated copper, copper-coated steel, or other electrically conductive material. The conductive coils may also have the same or different wire gauge sizes.

FIG. 3 is a schematic view of a cross-sectional portion of the rotor 120 having multiple rotor winding sets 150 in electrical communication with a power transfer circuit 160, in accordance with one or more implementations of the disclosure. As illustrated in FIG. 3, the portion of the rotor 120 includes a rotor slot 140 as defined by two adjoining rotor protrusions 130 (e.g., upper rotor protrusion 130A and lower rotor protrusion 130B).

The rotor slot 140 includes an inner wall 142, an outer wall 144, an upper sidewall 146, and a lower sidewall 148. The inner wall 142 is located radially a distance from the center of the rotor 120. The outer wall 144 is located radially a distance greater than the distance of the inner wall 142 from the center of the rotor 120.

The upper sidewall 146 and the lower sidewall 148 are connected to the inner wall 142 and the outer wall 144 in a manner that an enclosure is formed within the rotor slot 140. The upper sidewall 146 is a section of one of the protrusions (i.e., upper rotor protrusion 130A). The lower sidewall 148 is a section of the other protrusion (i.e., lower rotor protrusion 130B).

Each of the rotor protrusions 130 is wrapped with a rotor winding set 150 having an inner set 152 and an outer set 154. For each rotor protrusion 130, the inner set 152 is disposed between the inner wall 142 and the outer set 154. Likewise, the outer set 154 is disposed between the inner set 152 and the outer wall 144 for each rotor protrusion 130. The inner sets 152 are electrically connected with each other. The outer sets 154 are electrically connected with each other.

A power transfer circuit 160 is operable for independently controlling the electrical excitation of the rotor winding sets 150 by providing electrical currents (e.g., inner current 162 and outer current 164) to the rotor winding sets 150. The inner current 162 and the outer current 164 are in the form of direct current. The power transfer circuit 160 is electrically connected to form a circuit with the inner sets 152 and is configured to provide an inner current 162 to the inner sets 152. The inner sets 152 are electrically excited by the inner current 162 during the operation of the electric machine 100.

The power transfer circuit 160 is electrically connected to form a circuit with the outer sets 154 and is configured to provide an outer current 164 to the outer sets 154. The outer sets 154 are electrically excited by the outer current 164 during the operation of the electric machine 100. The inner sets 152 and outer sets 154 may be electrically excited separately or concurrently since the inner sets 152 and outers sets are connected on separate circuits with the power transfer circuit 160.

The power transfer circuit 160 includes brush and slip rings (not shown) for the inner sets 152 and for the outer sets 154. The brush and slip rings allow the rotor 120 to rotate within the stator 110 while supplying electrical currents to the inner sets 152 and the outer sets 154. The power transfer circuit 160 further includes a power supply for supplying electrical energy to the power transfer circuit 160. The power transfer circuit 160 may further include a field control circuit for regulating the electrical currents supplied to the rotor winding sets 150 and an armature control circuit for adjusting the voltage or electrical currents supplied to the rotor winding sets 150. An example of an armature control circuit is a pulse-width modulation (PWM) controller.

During operation of the electric machine 100, the stator 110 is excited with alternating current and creates a magnetic field. The inner sets 152 are excited with the inner current 162 supplied by the power transfer circuit 160 and generate a magnetic field. Likewise, the outer sets 154 are excited with the outer current 164 supplied by the power transfer circuit 160 and generate a magnetic field. The magnet fields of inner set 152 and outer set 154 interact with the magnetic field of the stator 110, causing the rotor 120 to rotate within the stator 110 according to a torque induced by the magnetic field of the stator 110 and create an output torque of the electric machine 100.

The output torque contains torque ripples since the alternating current is not a steady flow of current but contains fluctuations or harmonics in the current. To reduce or minimize the torque ripples, the inner current 162 and outer current 164 are shifted in time or position (i.e., electrical degrees) while being supplied to the inner sets 152 and outer sets 154, respectively. The shifting of the inner current 162 and outer current 164 has an effect of canceling some of the harmonics. Because a component of the torque ripple is caused by the harmonics, the torque ripples are reduced or minimized. Reducing or minimizing torque ripples improves the performance of the electric machine 100.

In addition to the improved performance, the winding sets 150 also provide redundancy in the event the inner sets 152 or the outer sets 154 decline or stop operating. Since the inner sets 152 and outer sets 154 are separately excited on a different electrical circuit, the electric machine 100 will continue to operate if either the inner sets 152 or the outer sets 154 stop working.

Figure 5:
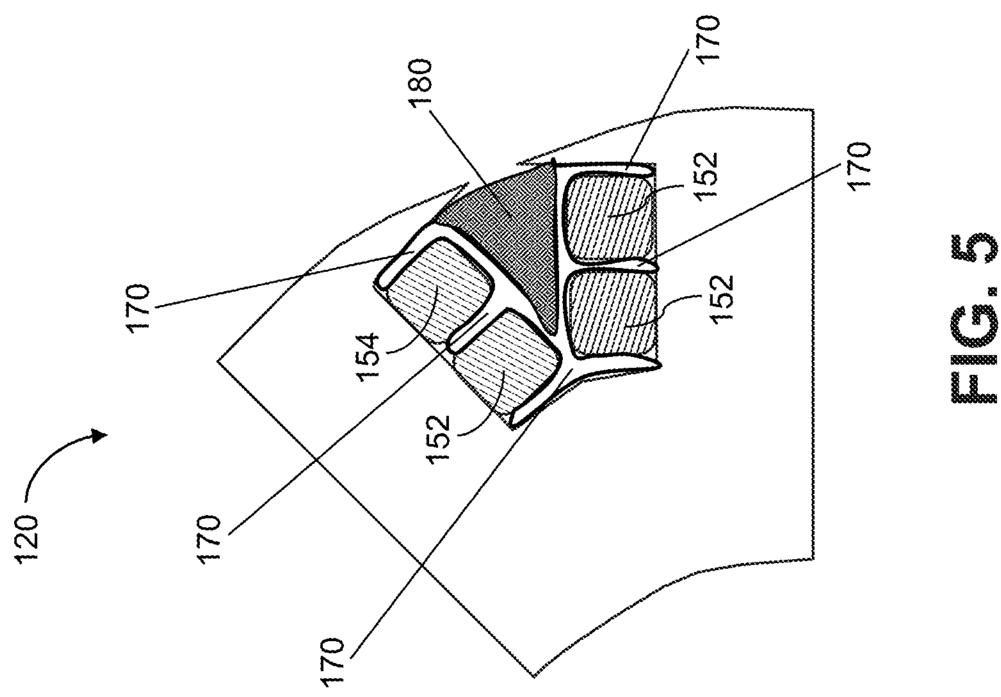
FIGS. 4-5 are exemplary cross-sectional views of a portion of the rotor having multiple rotor winding sets interacting with cooling channels of a cooling system, in accordance with one or more implementations of the disclosure.
Figure 4:
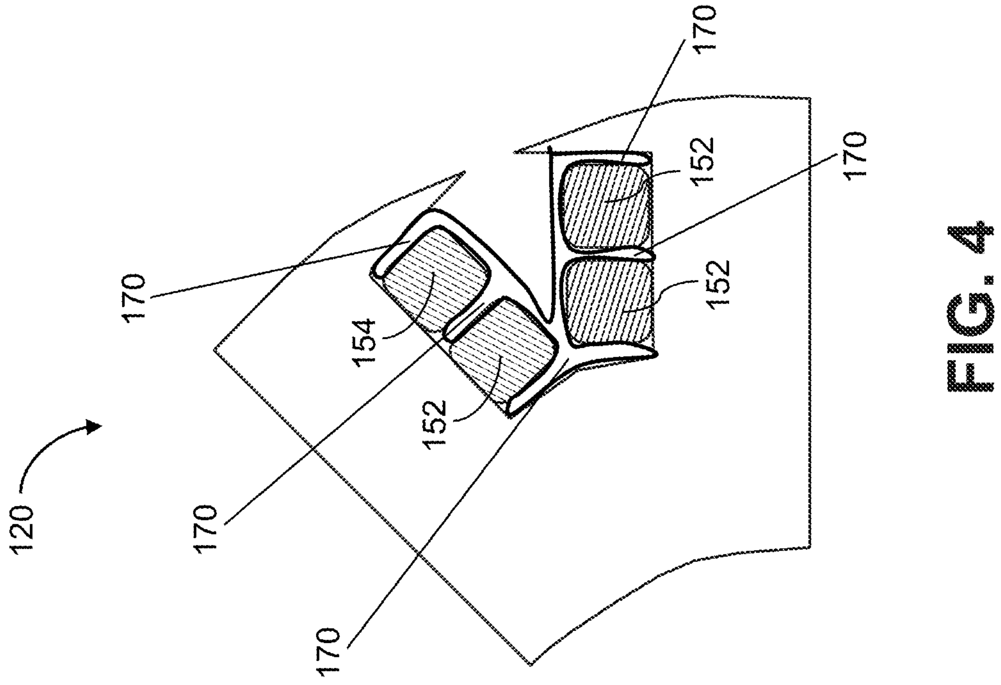

FIGS. 4-5 are exemplary cross-sectional views of a portion of the rotor 120 having multiple rotor winding sets 150 interacting with cooling channels 170 of a cooling system, in accordance with one or more implementations of the disclosure.

The cooling system is configured for removing thermal energy (i.e., heat) from the rotor slots 140. The cooling system includes one or more cooling channels 170 disposed within each of the rotor slots 140 and a cooling source (not shown) configured for pumping or circulating a fluid through the cooling channels 170. The cooling source may use a pump or another device for circulating the fluid within the cooling channels 170. The cooling source may include one or more transporting channels (not shown) axially traversing the rotor 120 and are in fluid communication with the cooling channels 170. The cooling channels 170 may be physically connected to one or more cooling channels 170. Both the transporting channels and cooling channels 170 include a hollow interior for holding or transporting the fluid. Non-limiting examples of the fluid include a coolant, air, water, oil, and/or the like.

As illustrated in FIG. 4 and FIG. 5, the cooling channels 170 are disposed adjacent to the winding sets 150 (e.g., inner set 152 and outer set 154), forming a physical interface between the cooling channels 170 and the winding sets 150. This interface allows the transfer of heat from the winding sets 150 to the fluid within the cooling channels 170.

The cooling channels 170 are made of a highly thermally conductive material for transferring the heat away from the winding sets 150. Non-limiting examples of highly conductive materials are diamond, silver, copper, gold, aluminum nitride, silicon carbide, aluminum, tungsten, graphite, and zinc. The thermally conductive material may have a thermal conductivity of about 116 Watts per meter per degree Kelvin (W/m K) or greater.

The cooling channels 170 may be wrapped around the winding sets 150 in such a manner that the surface areas of the winding set 150 within the rotor slots 140 are substantially or completely covered by the cooling channels 170. For example, the cooling channels 170 may cover the surface areas of the inner set 152 disposed adjacent to the inner wall 142, disposed adjacent to the outer set 154, and disposed towards the interior of the rotor slot 140. Similarly, the cooling channels 170 may cover the surface areas of the outer set 154 disposed adjacent to the inner set 152, disposed adjacent to the outer wall 144, and disposed towards the interior of the rotor slot 140.

The cooling channels 170 may be shaped to dissipate heat from a middle gap coinciding with a middle area between the inner and outer sets 154. The cooling channels 170 may be shaped to dissipate heat from an inner gap coinciding with an inner area between the inner set 152 and the inner wall 142 associated. The cooling channels 170 may be shaped to dissipate heat from an outer gap coinciding with an outer area between the outer set 154 and the outer wall 144 associated therewith.

The cooling channels 170 may be coated with an insulating material to prevent electrical contact with the rotor winding sets 150 and to avoid reducing the performance of the electric machine 100. Non-limiting examples of insulating materials include epoxy resins.

FIG. 4 illustrates the cooling channels 170 without encapsulations. The cooling channels 170 may be supported by a stiffener to provide a rigid backing to the portion of the cooling channels 170 not adjacent to the winding sets 150. Non-limiting examples of stiffener include steel, aluminum, cast iron, composite materials, plastic and polymers, thermosetting materials, and/or the like.

FIG. 5 illustrates the cooling channels 170 with encapsulations. The rotor slot 140 is encapsulated or filled with encapsulating material 180 to provide rigid support to the cooling channels 170 not adjacent to the winding sets 150. Non-limiting examples of encapsulating materials include epoxy resins, polyester resins, polyurethane resins, silicone rubber, potting compounds, thermoplastics materials (e.g., polypropylene or polycarbonate), composite encapsulation materials that combine resin with reinforcing fibers or fillers, and/or the like.

During operation of the electric motor, the winding sets 150 increase in temperature. Heat is transferred from the winding sets 150 to the fluid circulating within the cooling channels 170. The temperature of the fluid increases because of the additional thermal energy the fluid receives from the winding sets 150. The fluid is transported away from the winding sets 150 and then dissipates the excess thermal energy before recycling through the cooling system. Once recycled through the cooling system, the fluid returns via the cooling channels 170 to transfer thermal energy away from the winding set 150.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An electric machine, comprising:

a stator including a plurality of stator windings configured for generating a magnetic field;

a rotor configured for rotating within the stator according to a torque induced by the magnetic field, the rotor including a plurality of electrically independent rotor winding sets wrapped around each of a plurality of circumferentially spaced rotor protrusions; and a power transfer circuit operable for independently controlling electrical excitation of the rotor winding sets, wherein the rotor winding sets include an inner set and an outer set, with the power transfer circuit operable for providing an inner current operable for electrically exciting the inner set and an outer current operable for electrically exciting the outer set.

2. The electric machine according to claim 1, wherein:

the inner sets include a plurality of inner conducting coils and the outer sets include a plurality of outer conducting coils, with the inner and outer conducting coils being wrapped around the rotor protrusions with an equal quantity of turns.

3. The electric machine according to claim 1, wherein:

the inner sets include a plurality of inner conducting coils and the outer sets include a plurality of outer conducting coils, with the inner and outer conducting coils being wrapped around the rotor protrusions with an unequal quantity of turns.

4. The electric machine according to claim 1, wherein:

the inner sets include a plurality of inner conducting coils and the outer sets include a plurality of outer conducting coils, with the inner and outer conducting coils being composed of the same material.

5. The electric machine according to claim 1, wherein:

a plurality of conducting coils of one or more of the winding sets include a first material and a plurality of conducting coils of another one of the winding sets include of a second material differing from the first material.

6. The electric machine according to claim 1, wherein:

each of the winding sets include a plurality of conducting coils having the same cross-sectional area.

7. The electric machine according to claim 1, wherein:

a plurality of conducting coils of one or more of the winding sets has a first cross-sectional area and a plurality of conducting coils of another one of the winding sets has a second cross-sectional area, the second cross-sectional area differing from the first cross-sectional area.

8. The electric machine according to claim 7, wherein:

the conducting coils having the first cross-sectional area generate a first current density when excited with a first amount of electrical current, and the conducting coils having the second cross-sectional area generate a second current density when excited with the first amount of electrical current.

9. The electric machine according to claim 1, further comprising:

the rotor includes a plurality of rotor slots shaped between each adjoining rotor protrusion; and a cooling system configured for dissipating heat away from the rotor slots.

10. The electric machine according to claim 9, wherein:

the cooling system includes:

one or more cooling channels disposed within each of the rotor slots; and a coolant source configured for circulating a coolant through the cooling channels to dissipate heat therefrom.

11. The electric machine according to claim 10, wherein:

one or more of the cooling channels are shaped to wrap substantially around each of the windings sets.

12. The electric machine according to claim 10, wherein:

one or more of the cooling channels are shaped to contact three sides of each of the winding sets.

13. The electric machine according to claim 10, wherein:

the rotor winding sets include an inner set and an outer set, the inner set is disposed radially inward relative to the outer set.

14. The electric machine according to claim 13, wherein:

the rotor slots are shaped to include an inner wall, an outer wall, an upper sidewall, and a lower sidewall such that the inner set is proximate the inner wall and the outer set is proximate the outer wall.

15. The electric machine according to claim 14, wherein:

one or more of the cooling channels are shaped to dissipate heat from a middle gap coinciding with a middle area between the inner and outer sets.

16. The electric machine according to claim 14, wherein:

one or more of the cooling channels are shaped to dissipate heat from an inner gap coinciding with an inner area between the inner set and the inner wall associated.

17. The electric machine according to claim 14, wherein:

one or more of the cooling channels are shaped to dissipate heat from an outer gap coinciding with an outer area between the outer set and the outer wall associated therewith.

18. An electric machine, comprising:

a stator;

a rotor configured for rotating within the stator, the rotor including a plurality of circumferentially spaced rotor protrusions and a plurality of rotor slots shaped between each adjoining rotor protrusions, with at least an inner rotor winding and an outer rotor winding wrapped around each of the rotor protrusions, the inner and outer rotor windings being independently excitable;

a power transfer circuit operable for independently controlling electrical excitation of the rotor windings; and a cooling system configured for dissipating heat away from an interior of the rotor protrusions, the cooling system includes one or more cooling channels disposed within each of the rotor slots and a coolant source configured for circulating a coolant through the cooling channels to dissipate heat therefrom.

19. A motor vehicle, comprising:

a vehicle body;

multiple drive wheels mounted to the vehicle body; and a synchronous electric machine mounted to the vehicle body and operable to drive one or more of the drive wheels to thereby propel the motor vehicle, the synchronous electric machine including:

a stator including a plurality of stator windings configured for generating a magnetic field;

a rotor configured for rotating within the stator according to a torque induced by the magnetic field, the rotor including a plurality of electrically independent rotor windings sets wrapped around each of a plurality of circumferentially spaced rotor protrusions, the rotor winding sets include an inner set and an outer set;

a power transfer circuit operable for independently controlling an excitation of each of the rotor winding sets, the power transfer circuit operable for providing an inner current operable for electrically exciting the inner set and an outer current operable for electrically exciting the outer set; and a cooling system configured for dissipating heat away from the rotor protrusions, the cooling system includes one or more cooling channels disposed within each of the rotor slots and a coolant source configured for circulating a coolant through the cooling channels to dissipate heat therefrom, wherein the rotor includes a plurality of rotor slots shaped between each adjoining rotor protrusions, the rotor slots are shaped to include an inner wall, an outer wall, an upper sidewall, and a lower sidewall such that the inner set is proximate the inner wall and the outer set is proximate the outer wall, wherein the cooling channels are shaped to dissipate heat from a middle gap coinciding with a middle area between the inner and outer sets, from an inner gap coinciding with an inner area between the inner set and the inner wall associated, and from an outer gap coinciding with an outer area between the outer set and the outer wall associated therewith.

20. The motor vehicle of claim 19, wherein:

the rotor winding sets include an inner set and an outer set, with the power transfer circuit operable for providing an inner current operable for electrically exciting the inner set and an outer current operable for electrically exciting the outer set.

* * * * *